United States Patent [19]
Golshani et al.

[11] Patent Number: 5,819,277
[45] Date of Patent: Oct. 6, 1998

[54] METHOD FOR GENERATING SQL COMMANDS TO CREATE AN INTEGRATED GLOBAL SCHEMA

[76] Inventors: Forouzan Golshani, 5346 E. Royal Palm Rd., Paradise Valley, Ariz. 85253; Oris D. Friesen, 5136 E. LeMarche Ave., Scottsdale, Ariz. 85254-1667; Thomas H. Howell, 8201 E. Del Cadena Dr., Scottsdale, Ariz. 85258

[21] Appl. No.: 624,723

[22] Filed: Mar. 26, 1996

[51] Int. Cl.$^6$ .................................................. G06F 17/30
[52] U.S. Cl. .............................. 707/100; 707/4; 707/100; 707/103
[58] Field of Search ................................ 707/4, 100, 101, 707/102, 103, 10

[56] References Cited

U.S. PATENT DOCUMENTS

| | | | |
|---|---|---|---|
| 5,421,012 | 5/1995 | Khoyi et al. | 395/677 |
| 5,550,971 | 8/1996 | Brunner et al. | 707/3 |
| 5,560,005 | 9/1996 | Hoover et al. | 707/10 |
| 5,596,744 | 1/1997 | Dao et al. | 707/10 |

*Primary Examiner*—Thomas G. Black
*Assistant Examiner*—Donald Min
*Attorney, Agent, or Firm*—JS Solakian; EW Hughes

[57] ABSTRACT

A method practiced by a computer system for generating SQL commands to create an integrated global schema. The input is two relational schemas in object-oriented form and a list of correspondences between components, object classes, objects and attributes. Based on correspondences object classes within one schema are folded into one object class, or relation, and likewise, based on correspondences one relation from each input schema is merged into a single relation of the integrated schema. This process is continued until no more object classes can be folded together and no more can be merged. SQL commands are generated based on specified correspondences between attributes depending upon whether a relation of the integrated relational schema was derived from only one relation of one of the input schemas, or is the result of the merger of two relations each from a different input schema. In the latter case, correspondences are based on the attributes of merged relations.

8 Claims, 8 Drawing Sheets

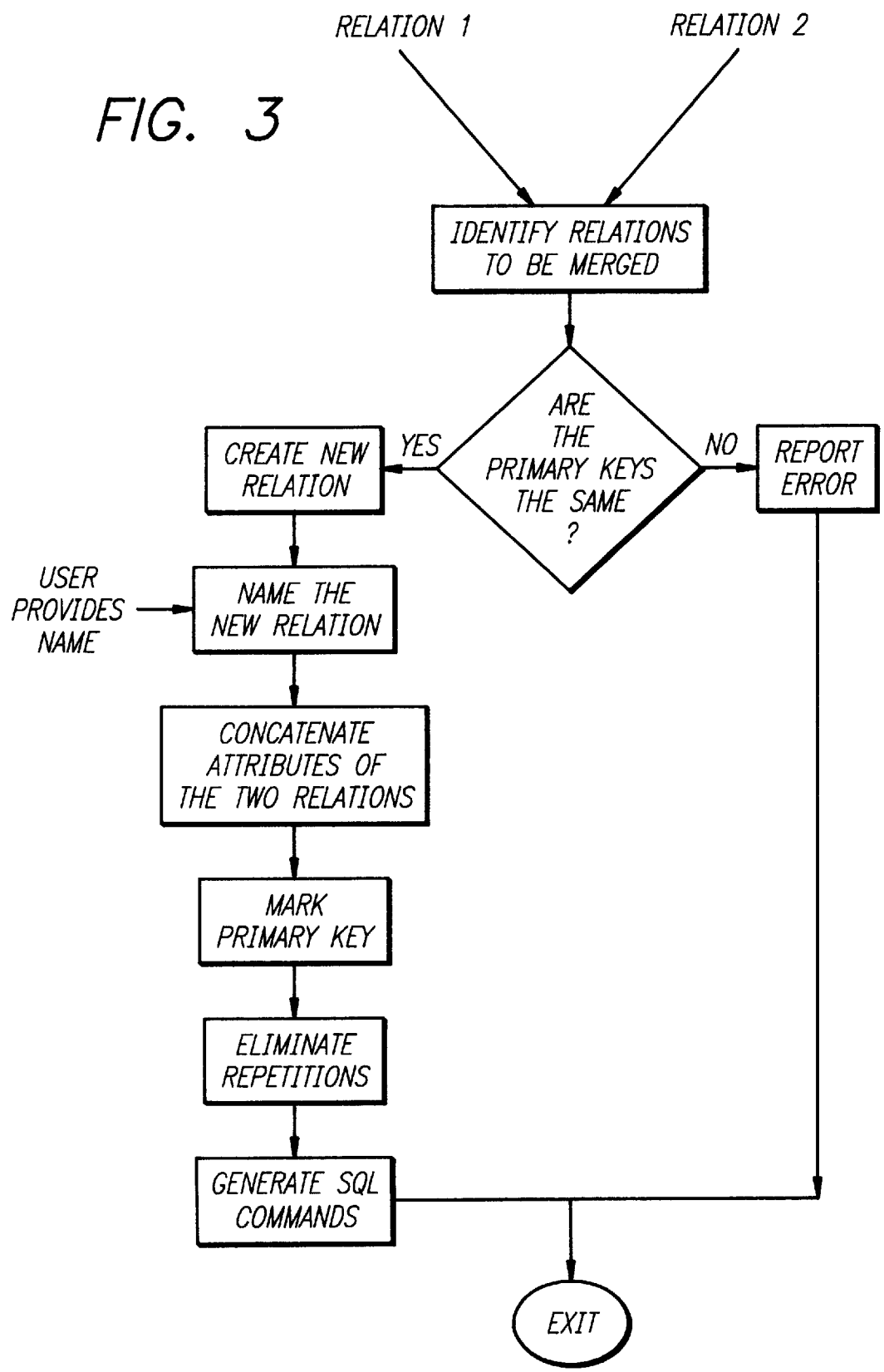

METHOD FOR GENERATING SQL COMMANDS TO CREATE AN INTEGRATED GLOBAL SCHEMA

CROSS-REFERENCE TO RELATED APPLICATIONS

U.S. Pat. application Ser. No. 08/624,726 of Forouzan Golshani, et al entitled Method of Integrating Schemas of Distributed Heterogeneous Databases filed concurrently herewith, which application is assigned to the assignee of the present invention.

BACKGROUND OF THE INVENTION

Field of the Invention

This invention relates to distributed database management systems and more particularly to a method for generating the necessary SQL commands that, given two database schemas along with the correspondences among their components, creates a global schema representing the integration of the two schemas based on the correspondences. This is the last step in the process of schema integration set forth in the above cross-referenced patent application. The resulting global schema is in relational form, and its relations reflect the embodiment of the correspondences specified on the underlying database objects by the user of the tool.

BACKGROUND OF THE INVENTION

Many enterprises have accumulated throughout the years, either by expansion or by acquisition, a number of database management systems (DBMS)s. These systems are generally heterogeneous in that they differ from one another with respect to platform, or computer system in which they reside, data model, language for implementation, languages for querying and updating, schema, and data types. With the trend toward interoperability in enterprises, it has become more and more necessary for the existing database management systems to cooperate and to exchange data. Without a software tool, or method, for schema integration, a user must either manually retrieve the local schemas of other database systems of interest or guess what may be available on other desired database systems which reside at a remote site. Without a global (integrated) schema, any query involving retrieval of data from more than one database system must be broken down manually, and partial answers received from the participating database systems must be merged by the user. For a description of a method for schema integration, reference is made to the above identified cross-referenced patent application which is hereby incorporated herein by reference and made a part hereof.

Schema Integration is the process of integrating a plurality of existing schemas into a single logical schema. The object is to provide a new and coherent view of the components of multiple database management systems. Usually these database systems are heterogeneous and originally were not designed to be interoperable.

The traditional method for schema integration is to manually write the appropriate SQL command in order to create relations that represent the integration of various components of each of the underlying databases. The method presented here relieves the user from this burden and, based on a set of correspondences specified on the schemas, generates the necessary code.

SUMMARY OF THE INVENTION

The present invention is a method practiced by a computer system that, given the description of a global schema for a collection of heterogeneous database systems, finds a set of suitable SQL commands for setting up the global relations along with their appropriate linkage to the participating databases. This method may be utilized in several applications including; client-server transaction processing systems, interconnection of open systems, schema modification, and database code generation tools.

BRIEF DESCRIPTION OF THE DRAWINGS

Other objects, features and advantages of the invention will be readily apparent from the following description of a preferred embodiment thereof although variations and modifications may be effected without departing from the spirit and scope of the novel concepts of the disclosure, and in which:

FIG. 3 illustrates the steps for merging two relations;

DESCRIPTION OF THE PREFERRED EMBODIMENT

Figure 1:
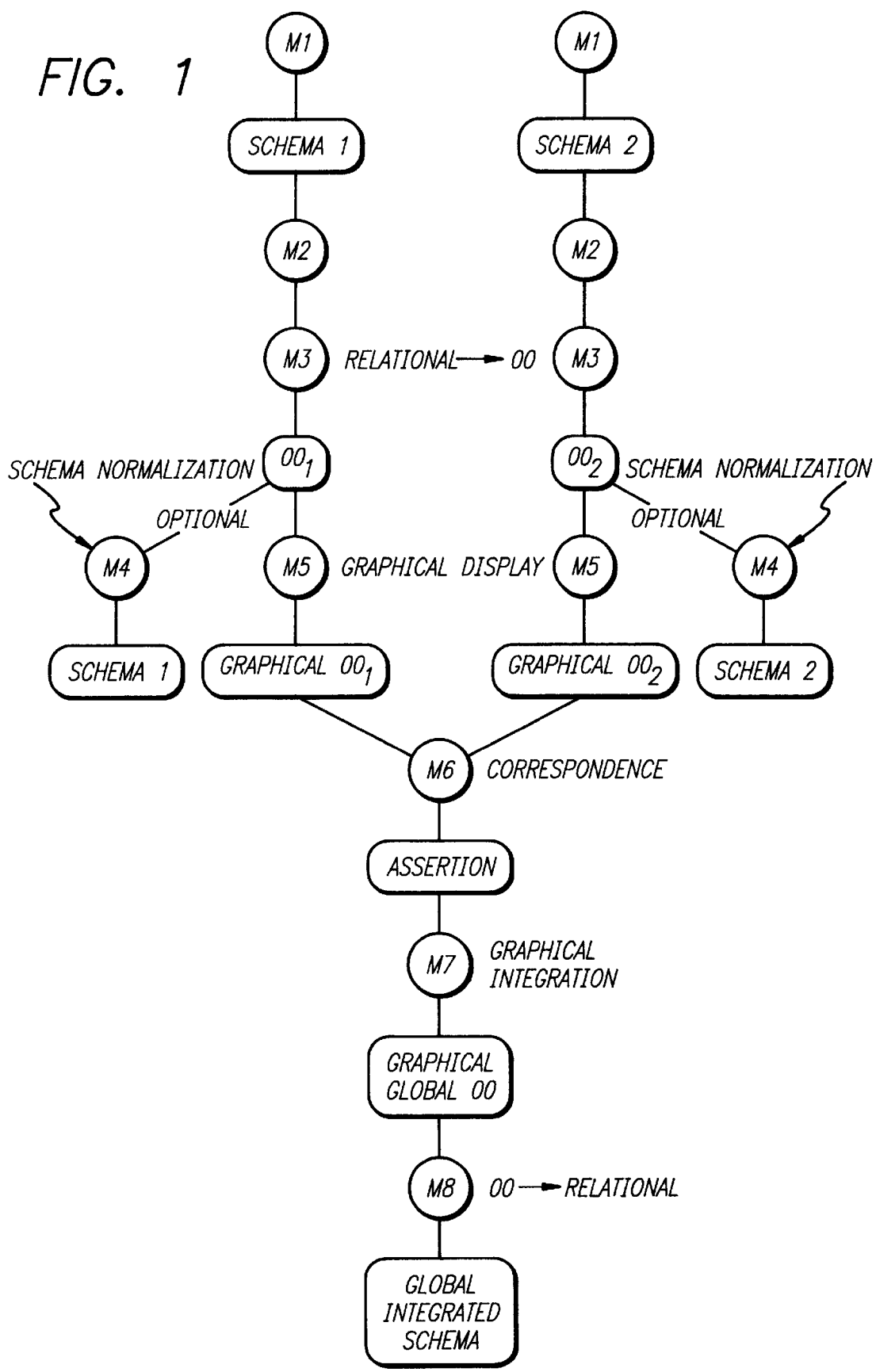
FIG. 1 is a data flow diagram of the components and software modules of the schema integration tool and illustrate the flow of information among the modules.

FIGS. 1a, and 1b illustrate the flow of information among the modules of the cross-referenced patent application for a method of integrating schemas. In FIGS. 1a and 1b circles represent software modules of the integration tool and rectangles represent objects created by the method, or process. This invention is identified with modules M7 and M8 of FIGS. 1a and 1b, which collectively provide the functionality described below.

Figure 2A:
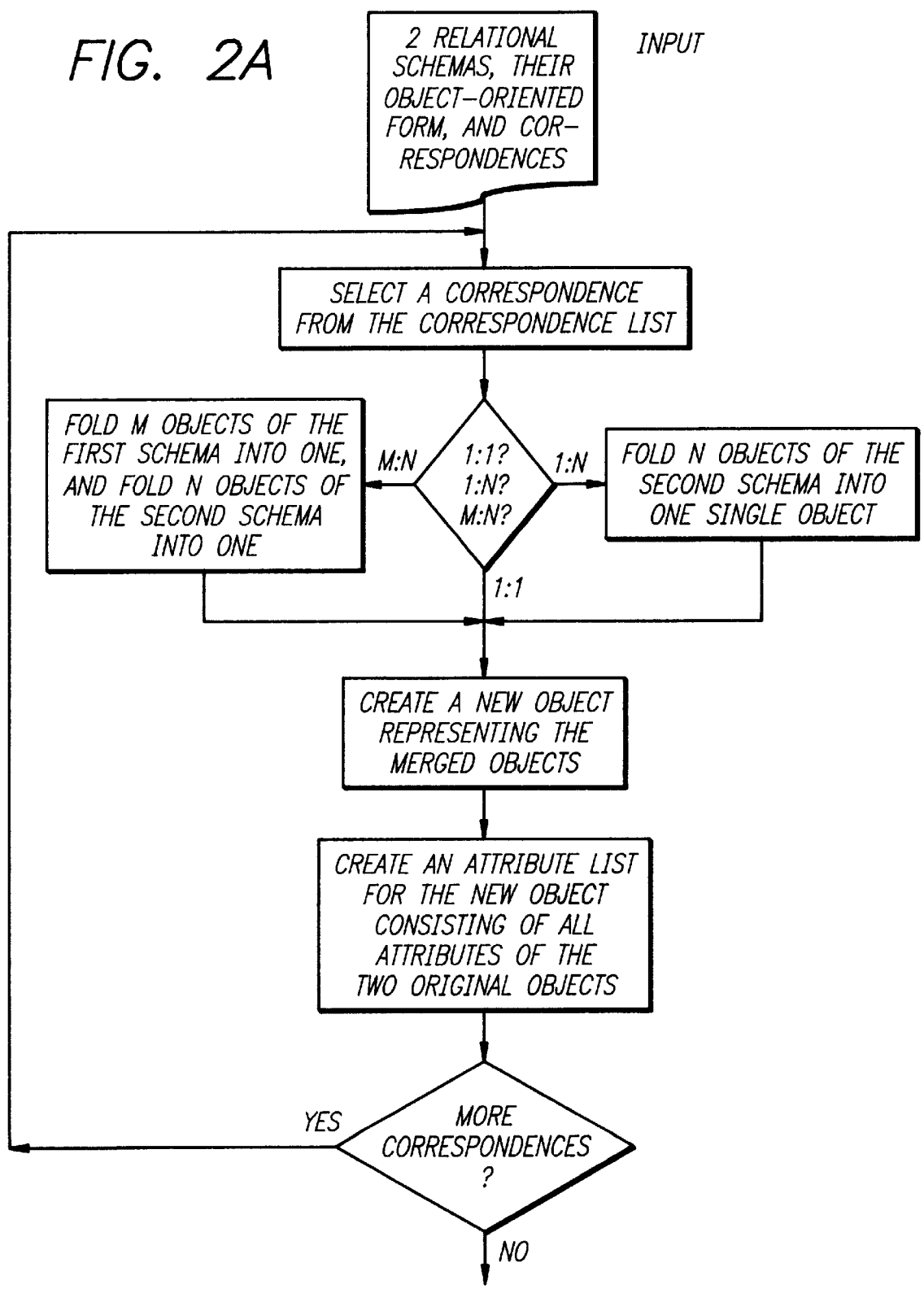
FIGS. 2a, 2b, and 2c are a flowchart detailing the required steps for this method.
Figure 2B:
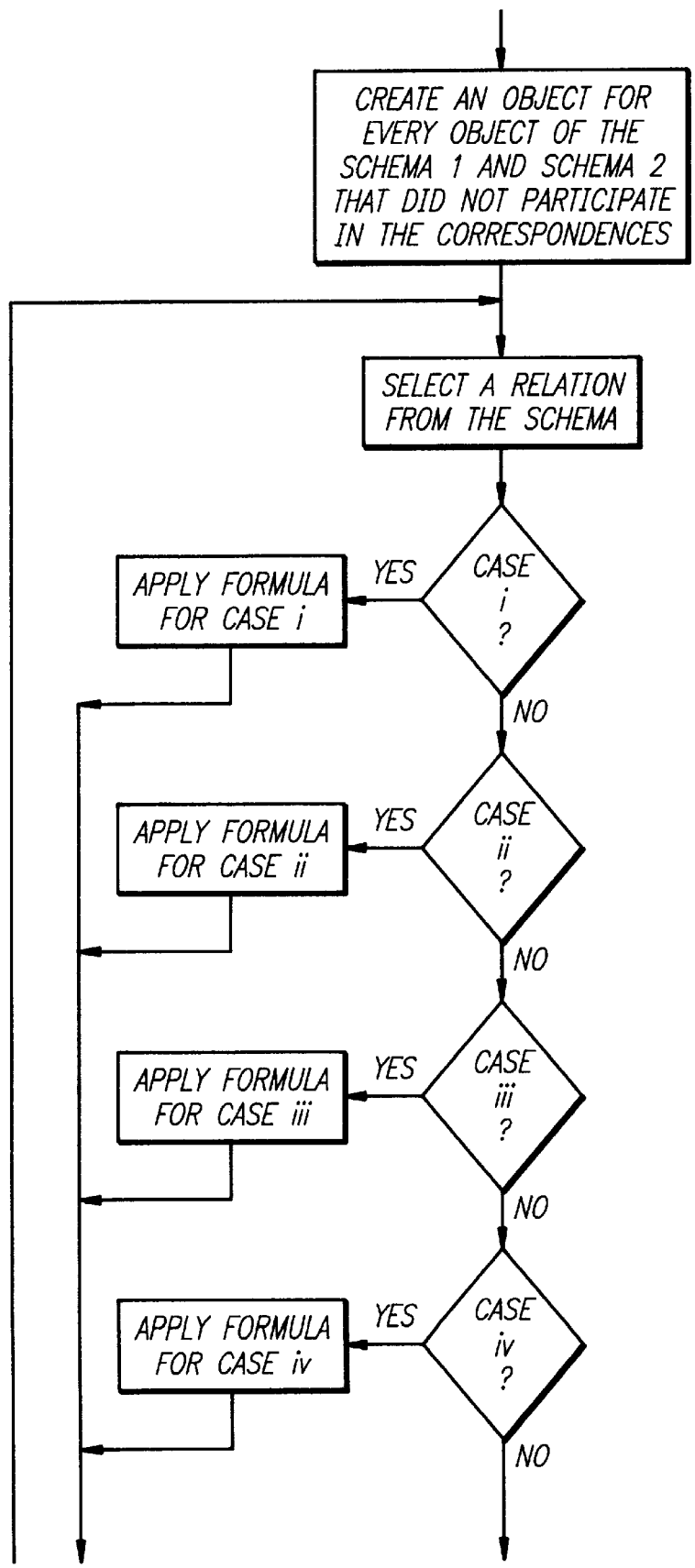
Figure 2C:
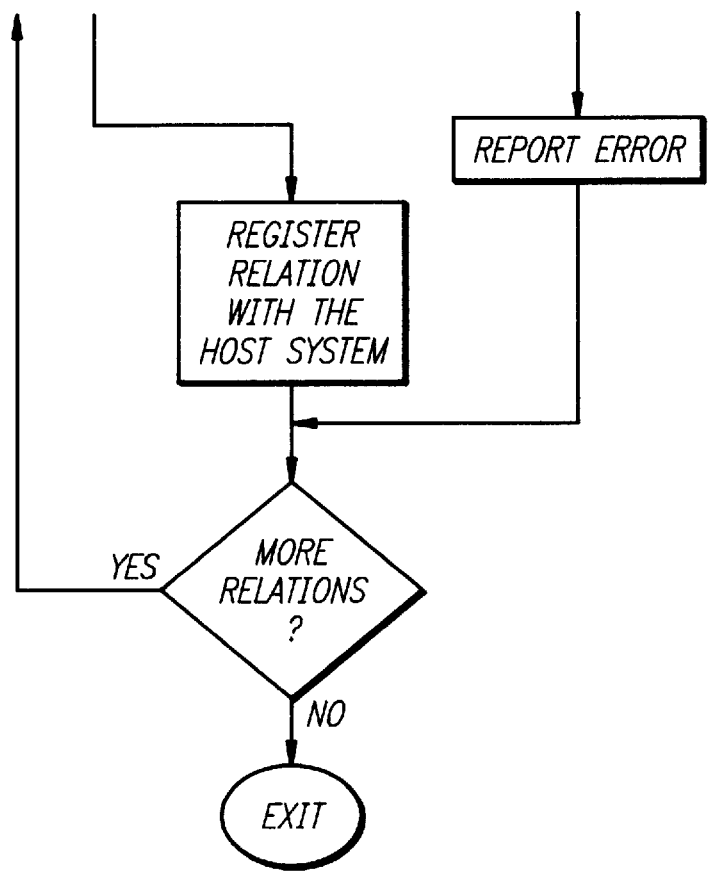

FIGS. 2a, 2b, and 2c illustrate the flowchart of the steps involved in this method as described below. The object of this method is to integrate two object-oriented schemas based on the specified correspondences and then to generate the correct SQL commands for registering the new database relations. The required inputs for this module are:

1. Relational schemas of two database systems to be integrated, and their object-oriented representations; and 2. Asserted correspondences specified between the components of the participating schemas.

In the following description the phrase "object class" or "object classes" are used interchangeably with "relation" or "relations". Module M7 integrates two input object-oriented schemas and generates an object-oriented schema representing the integration of said schemas. The output of module M7 is a file containing the object-oriented description of the integrated schemas. Once the files containing the object-oriented description of the two input schemas are read, the integration process is performed using correspondences specified, according to the following rules:

1. Object classes, or relations, between two schemas are merged using the merge operator. The merge operator merges two objects of an object class, each from a different schema based on assertions made on the attributes of those objects. The merge operator is illustrated in FIG. 3.

Figure 4:
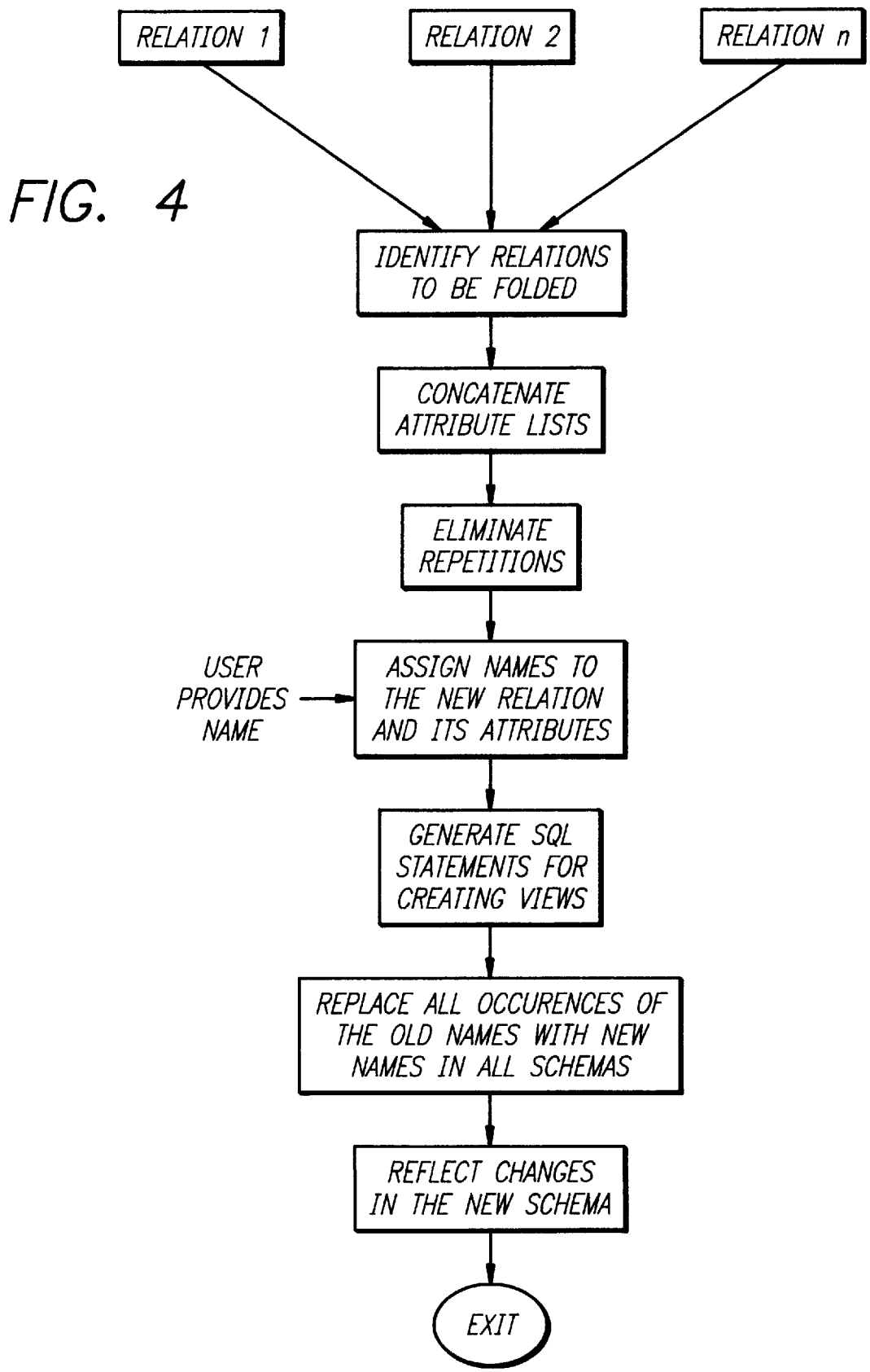
FIG. 4 illustrates the steps for folding, or combining, two relations at a time.

2. Object classes, or relations, within the same schema are folded together using the fold operator, the steps of which are illustrated in FIG. 4.

3. Correspondences between object classes to be merged can be 1:1, 1:N or M:N, where "M" and "N" are integers.

a. If the correspondence is 1:1, then the two object classes from each schema are merged into one. The name of the merged object class is specified by the user.
   b. If the correspondence is 1:N, then the N object classes in the corresponding schema are first folded together into one object class, and this object class is then merged with the object class of the other schema.
   c. If the correspondence is M:N, then the M object classes of one schema are first folded into one, then the N object classes of the other schema are folded into one, and finally, these two schemas are merged into one.

4. If any correspondence is specified between the attributes of the two object classes to be merged, then those attributes are integrated into a single attribute of the merged object class.

The next step, module 8, determines the appropriate SQL commands by which the relational views, or object classes, that embody the specified correspondences can be created. Each relation in the integrated schema is generated by an SQL statement, as is well known in the art, and is registered with the host system. For this purpose, the following cases are considered:

i The relation in the integrated schema corresponds to one and only one relation of one of the participating schemas, or stated another way, one of two schemas being integrated.
   ii The relation in the integrated schema is a combination of two relations, one from each participating schema, and the correspondence is specified on the primary key attributes of the relations.
   iii The relation in the integrated schema is a combination of two relations, one from each participating schema, and the correspondence is specified on the primary key attributes and other attributes of the relations.
   iv The relation in the integrated schema is a combination of two relations, one from each participating schema, and the correspondence is specified on non-primary key attributes of the relations.

The following notation is used in describing the above four cases.

The participating schemas: Schema 1 and Schema 2.
Schema 1 has relations r1, r2, r3, . . .
Schema 2 has relations s1, s2, s3, . . .
r1=(pk1, a11, a12, . . . )
r2=(pk2, a21, a22, . . . ) and so on.
Also,
s1=(p1, b11, b12, . . . )
s2=(p2, b21, b22, . . . ) and so on.
The integrated schema consists of relations i1, i2, i3, . . .
i1=(k1, ia11, ia12, . . . )
pk<i>, p<i>, k<i> represent the primary key attributes of r<i>, s<i>, and i<i> respectively, where <i>denotes the relation number.
SQL statements:
Case 1: The relation in the integrated schema corresponds to one and only one relation of one of the participating schemas.

Example: i1 corresponds to r1.

```
CREATE VIEW i1(k1, ia11, ia12, ...)
AS SELECT *
FROM r1
```

Case 2: The relation in the integrated schema is a combination of two relations, one from each participating schema. The correspondence is specified on the primary key attributes of the relations.

Example: i1 corresponds to r1 and s1. The correspondence specified on the primary key attributes can be Equals, Overlaps, Contains or Contained in.

```
CREATE VIEW i1(k1, ia11, ia12, ...)
AS
SELECT r1.pk1, r1.a11,...., s1.b11, ...
FROM r1, s1
WHERE r1.pk1 = s1.p1
UNION
SELECT r1.pk1, r1.a11,...., NULL, NULL, ...
FROM r1, s1
WHERE r1.pk1 <> s1.p1
UNION
SELECT s1.p1, NULL, NULL, ..., s1.b11, ...
FROM r1, s1
WHERE s1.p1 <> r1.pk1
```

Example: i1 corresponds to r1 and s1. The correspondence specified on the primary key attributes is disjoint.

```
CREATE VIEW i1(k1, ia11, ia12, ...)
AS
SELECT r1.pk1, r1.a11, ..., NULL, NULL
FROM r1
UNION
SELECT s1.p1, NULL, ...,s1.b11,...
FROM s1
```

Case 3: The relation in the integrated schema is a combination of two relations, one from each participating schema. The correspondence is specified on the primary key attributes and other attributes of the relations.

Example: i1 corresponds to r1 and s1. The correspondence specified on the primary key attributes can be Equals, Overlaps, Contains, or Contained in. Also, r1.all corresponds to s1.b11, and the retrieval is from r1.a11.

```
CREATE VIEW i1(k1, ia11, ia12, ...)
AS
SELECT r1.pk1, r1.a11,...., s1.b12,...
FROM r1, s1
WHERE r1.pk1 = s1.p1
UNION
SELECT r1.pk1, r1.a11,...., NULL, NULL,...
FROM r1, s1
WHERE r1.pk1 <> s1.p1
UNION
SELECT s1.p1, s1.b11, NULL, ..., s1.b12,...
FROM r1, s1
WHERE s1.p1 <> r1.pk1
```

Case 4: The relation in the integrated schema is a combination of two relations, one from each participating schema. The correspondence is specified on non-primary key attributes of the relations.

Example: i1 corresponds to r1 and s1, and r1.a11 corresponds to s1.b11.

```
CREATE VIEW i1(k1, ia11, ia12, ...)
AS
SELECT r1.pk1, r1.a11, ..., NULL, NULL
FROM r1
UNION
SELECT s1.p1, s1.b11, NULL, NULL,...,s1.b12,...
FROM s1
```

FIG. 3 is a flow chart of the process of merging two relations, or object classes, when the two belong to two different schemas. The key information is first checked to ensure that they have the same primary keys. A new relation, whose name is specified by the user in the process of integration, is created. The primary key of the new relation is the common primary key of the two participating relations. Other attributes of the relation are created based on the correspondences obtained from the user in the integration process. The next step is the elimination of repeated attributes and duplications. Finally the SQL view statements that create the internal referencing between merged relations are generated.

FIG. 4 is a flow chart of a process which is similar to merging, except that the relations, or object classes, must belong to the same schema. If two or more relations (say R1, R2 and R3) in the same schema are identified to correspond to a relation R4 in another schema, then relations R1, R2 and R3 must be folded before being integrated with the corresponding relation R4. One common application of folding is for combining a general object with a more specific object. The fold operator allows a general object to absorb a more specific object. For example an object such as a "student" is more specific than an object such as "person". The fold operator allows these two objects to be combined, by "person" absorbing "student".

The steps of the fold operator include the following: identification of relations to be folded; concatenation of the attribute lists; elimination of repetitions; naming of common attributes based on user preferences; generation of SQL view statements reflecting the internal references of the new relation to the old relation; and replacing of all occurrences of the old relation names by the new name in all schemas.

Figure 5:
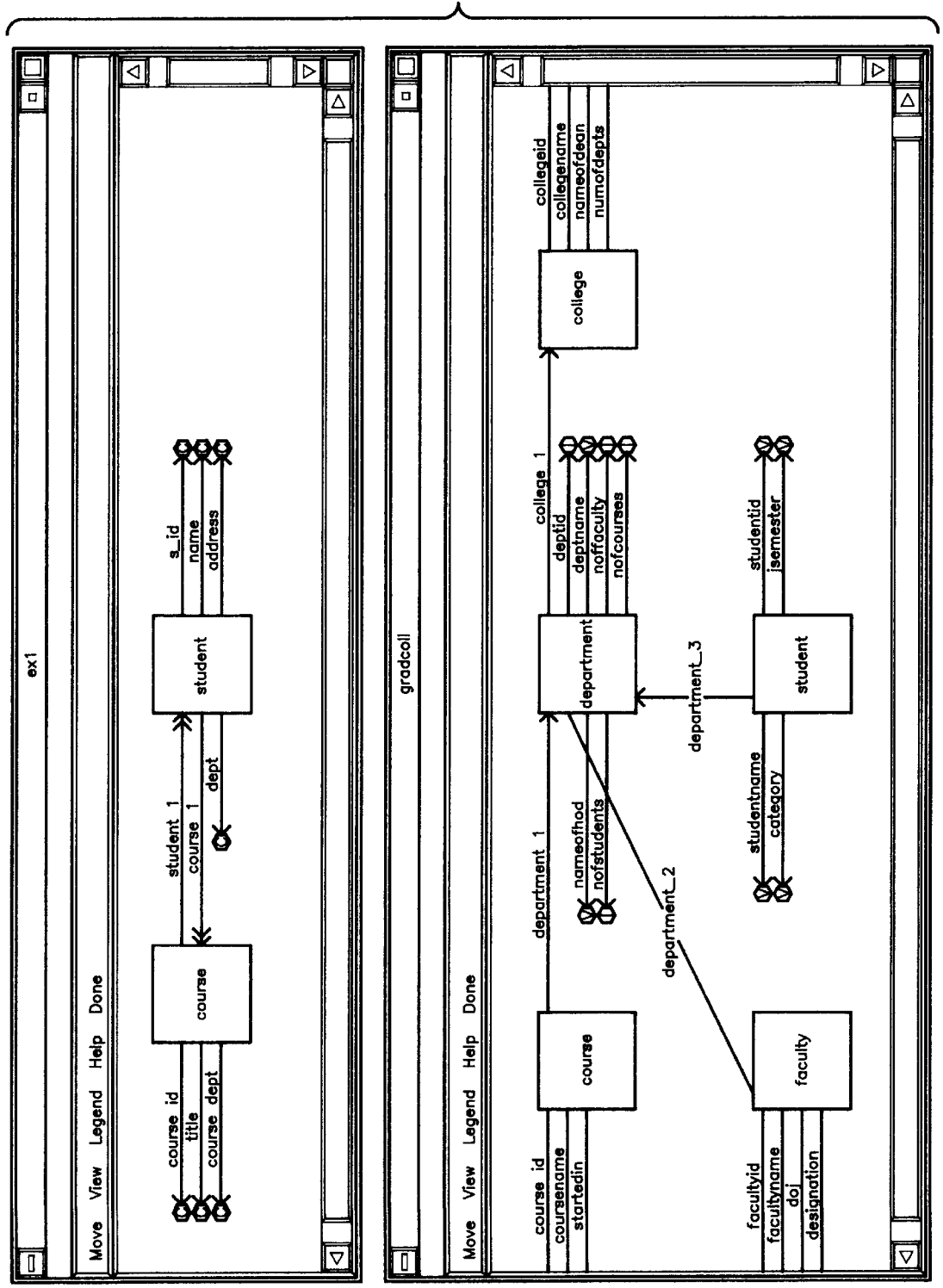
FIG. 5 illustrates the appearance of a computer monitor displaying two schemas to be integrated.
Figure 6:
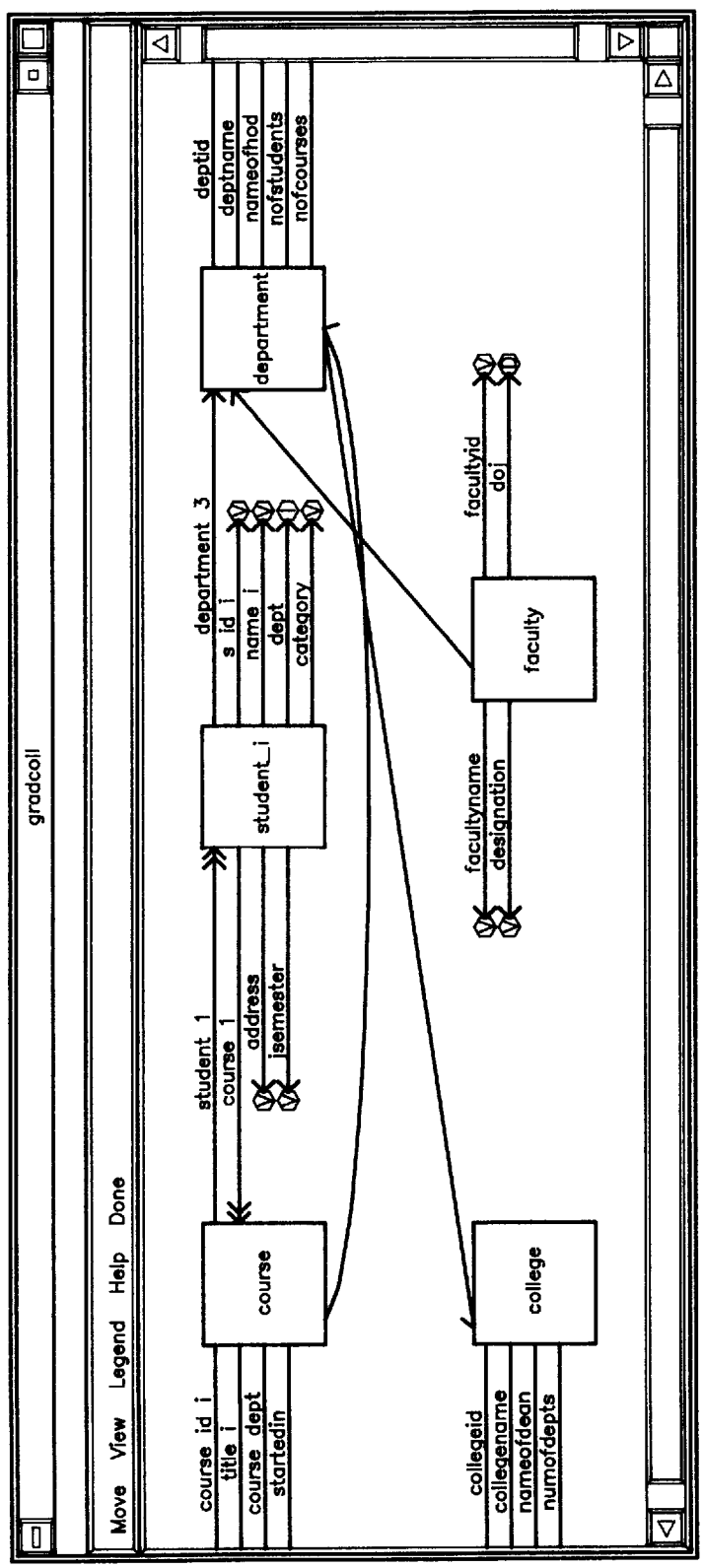
FIG. 6 illustrates the results of the integration of the two schemas as displayed by the monitor of the computer system.

FIG. 5 illustrates two schemas to be integrated, and the resulting integrated schema is illustrated in FIG. 6.

What is claimed is:

1. A method residing in a computer system for integrating two relational schemas in object-oriented form to produce an integrated schema and for generating SQL commands for registering relations of the integrated schema: comprising the steps of:

a, receiving as inputs two relational input schemas of databases to be integrated in object-oriented form and specified correspondences between components, object classes, objects and attributes of said two schemas;

b, folding together object classes within the same schema into one schema based on respective correspondences of attributes;

c, merging two object classes, each object class being from a different input schema, based on assertions with respect to the attributes of said two object classes to produce an integrated object class of the integrated schema;

d, repeating steps b and c until there are no more correspondences between attributes of the object classes of either of said input schemas that can be folded together and no more object classes that can be merged;

e, creating an object class in the integrated schema for every object class of the two input schemas that remain after the completion of step d;

f, generating SQL commands based on specified correspondences between attributes of the relations, with each SQL command generating a relation of the integrated schema depending upon whether the integrated relation corresponds to one and only one relation of one of the input schemas, or is the result of the merger of two relations one from each of the input schemas, and if the latter on specified correspondences of the attributes of the two relations of the input schemas.

2. The method of claim 1 in which in step f, the integrated relation is the result of the merger of two relations one from each of the input schemas based on correspondences between the primary key attributes of said two relations.

3. The method of claim 2 in which in step f, the integrated relation is the result of the merger of two relations one from each of the input schemas based on correspondences between the primary key attributes and other attributes of said two relations.

4. The method of claim 2 in which in step f, the integrated relation is the result of the merger of two relations one from each of the input schemas based on correspondences between non-primary key attributes of said two relations.

5. A method residing in a computer system for integrating two relational schemas in object-oriented form and for generating SQL commands for registering relations of the integrated database; comprising the steps of:

a, receiving as inputs two relational input schemas of databases to be integrated in object-oriented form and a specified list of correspondences between components, relations and attributes, of said two schemas;

b, selecting a pair of relations that correspond from the correspondence list;

c, folding together corresponding relations within the same schema;

d, merging two corresponding relations one from each of the two input schemas to form a new integrated relation;

e, creating a list of attributes for the newly integrated relation including all of the attributes of the two relations from which formed;

f, repeating steps b–e until there are no more relations that correspond;

g, creating a relation for every relation of the two input schemas remaining at the completion of step f in the integrated schema;

h, generating SQL commands for each relation of the integrated schema based on whether derived from a relation corresponding to one and only one input schema, or on whether derived from two relations, one from each of the input schemas; and if derived from two relations, then based on specified correspondence between attributes of said two relations.

6. The method of claim 5 in which in step h, each relation of the integrated schema derived from two relations, one from each of the input schemas is based on correspondences between the primary key attributes of said two relations.

7. The method of claim 5 in which in step h, each relation of the integrated schema derived from two relations, one from each of the input schemas is based on correspondences between the primary key attributes and other attributes of said two relations.

8. The method of claim 5 in which in step h, each relation of the integrated schema derived from two relations, one from each of the input schemas is based on correspondences between the non-primary key attributes of said two relations.

* * * * *